United States Patent [19]
Yoo

[11] Patent Number: 5,869,116
[45] Date of Patent: Feb. 9, 1999

[54] METHOD FOR PREPARING KIMCHI

[76] Inventor: Byong W. Yoo, P.O. Box 4879, Silver Spring, Md. 20914-4879

[21] Appl. No.: 966,162

[22] Filed: Nov. 7, 1997

[30] Foreign Application Priority Data

Jan. 6, 1997 [KR] Rep. of Korea ............ 1997-115

[51] Int. Cl.$^6$ .................. A23B 7/10; A23F 3/00; A23L 1/30; A23K 1/175
[52] U.S. Cl. ................. 426/49; 426/72; 426/74; 426/638
[58] Field of Search ............... 426/49, 72, 74, 426/534, 638, 262

[56] References Cited

U.S. PATENT DOCUMENTS

| | | | |
|---|---|---|---|
| 4,476,112 | 10/1984 | Aversano ................... | 424/127 |
| 4,937,085 | 6/1990 | Cherry et al. ............... | 426/269 |
| 5,084,293 | 1/1992 | Todd, Jr. ................... | 426/541 |
| 5,258,179 | 11/1993 | Bracco et al. ............... | 424/94.1 |
| 5,417,994 | 5/1995 | Chang et al. ............... | 426/330.3 |
| 5,520,933 | 5/1996 | Yoshida et al. ............. | 426/7 |
| 5,562,942 | 10/1996 | Koh et al. .................. | 426/649 |

OTHER PUBLICATIONS

"The Most Popular Dish: Kimchi", http://www.akita–u.ac.jp Oct. 5, 1996 updated.
"Effect of fermentation temperature . . . mustard leaf . . . Kimchi during various storage Days", Journal of Korean Society of Food and Nutrition, (1995) 24(5) 752–757.
Principles of Food Chemistry, AVI Publishing Company, pp. 318–325, 1980.

*Primary Examiner*—Nina Bhat
*Attorney, Agent, or Firm*—Aquilino & Welsh

[57] ABSTRACT

A method for preparing kimchi including the steps of adding less than 2.4% by weight Vitamin C and less than 1% by weight Vitamin E to a mixture of vegetables and spices prior to fermentation and then fermenting the mixture. Vitamin C or Vitamin E or both can be added to the mixture. The Vitamin C is selected from ascorbic acid, calcium ascorbate and sodium ascorbate. Organic acids may be added together with the Vitamin C and Vitamin E to the preparation of the kimchi.

8 Claims, No Drawings

METHOD FOR PREPARING KIMCHI

FIELD OF THE INVENTION

The present invention relates to a method for preparing Kimchi (pickled vegetables) by fortifying it with Vitamin C or Vitamin E or both and by replacing the table salt(NaCl) with more nutritional salts.

BACKGROUND ART

Kimchi is the most important side dish in Korean diet. Kimchi contains valuable phytochemicals-phytonutrients and has been known to Koreans as an essential part of the traditional Korean diet.

Kimchi is a pickled product made from chinese cabbage, western cabbage, radish, turnip, mustard green, dandelion, cucumber, carrot, beet, gingerroot, green onion, onion, garlic, fishes with salt. Depending on the temperature of the environment, the mixture is fermented anywhere from two days to a month.

Unfortunately, kimchi is known to contain precursors for cancer causing compounds such as nitrites, nitrates, and secondary amines for the formation of nitrosamines. Kimchi is not a well balanced food since it is purely from plant sources.

This invention is supposed to make kimchi a more balanced, quality product by adding Vitamin C, E and other nutritional mineral salts in order to reduce the risk of forming carcinogens.

SUMMARY OF THE INVENTION

The above problem can be solved by a method for preparing kimchi according to the present invention. This invention is a method of preparing kimchi by fortifying kimchi substrate with Vitamin C, E and mineral salts in order to reduce the risk of nitrate and nitrosocompound, as well as improving nutritional qualities of kimchi.

This method can be applied to other pickled products, salted seafood sauce, soybean and hot pepper bean paste, and cured meat products by fortifying with nutritional mineral salts.

DETAILED DESCRIPTION OF THE INVENTION

The present invention relates to a method for preparing Kimchi by fortifying it with Vitamin C, E or both and by replacing the table salt(NaCl) with more nutritional salts.

Kimchi is made from vegetables, spices, and less than 2.4% Vitamin C and less than 1% Vitamin E are added to weight of mixture prior to fermentation. Vegetables are selected from Chinese cabbage, regular cabbage, radish, cucumber, mustard green, dandelion dandelion, chicory, endive, perilla leaves, bell flower plant root, leek and chives, garland chrysanthemum, burdock, ginseng root, kale, collard greens, lettuce, squash and broccoli, and spices are selected from Japanese parley, spring onion, garlic, onion, ginger root, hot pepper, salt and seafood sauces.

Kimchi(pickled vegetables) has been consumed for centuries in the Orient and has become the most important side dish in Korean families, only second to rice.

However, mixtures of vegetables(Chinese cabbage, Oriental radish, etc.) for kimchi are found to contain higher concentration of nitrates in comparison with sauerkraut or pickled cucumbers.

The average Korean eats about 180 g(6 ounces) of vegetables a day. This amount is consumed daily throughout their life in the form of kimchi. As a result, the amount of nitrate and salt consumed may be higher in this ethnic group in comparison to any other. In addition, this ethnic group is reported to have the highest incidence of stomach cancer. Rice and barley are not carcinogens; therefore, speculation exists that kimchi may very well be the culprit. It is an important concern to reduce the possible risks of nitrate in becoming cancer causing agents such as nitrosamine and other nitrosocompounds in metabolic systems.

Therefore, the fortification of kimchi with Vitamins C and/or E will be beneficial in addition to the replacement of table salt with another salt.

The delicate flavor and taste of kimchi is thought to enhance the appetite and simultaneously supply the body with many kinds of micro-essential nutrients (phytochemicals-phytonutrients) and food fibers. Koreans are known to have a reduced risk of breast, prostate, cancer this may be the result of the consumption of kimchi and soy related products.

However, Koreans and other pickled product consumers are reported to have a higher incidence of stomach cancer because pickled products contain higher concentrations of nitrate and salt.

The U.S. Surgeon General's report on Nutrition and Health(1998) summarized that salt-pickled foods contain both nitrates and nitrites these compounds can form carcinogenic nitrosamines in the mouth and stomach.

Further reports state that there is a correlation between stomach cancer and pickled foods.

In 1994, Seel et al reported that a few cities in South Korea contain different amounts of nitrate in their kimchi; 1150 mg/kg in Chon Chu City, 1951 mg/kg in Chin An, and 2130 mg/kg in Kim Che in North Cholla Province.

North Cholla Province reports that the incidence of stomach cancer made up 32% of all cancer patients between 1963–1990. Researchers speculate that higher concentrations of nitrate in kimchi may cause higher occurrence of stomach cancer among Koreans. About 70 years age, approximately 10% stomach cancer was reported in U.S., but increased consumption of foods containing Vitamin C year round(Weisbuger 1979), has reduced the incidence of stomach cancer to only 2% in 1990(Passwater).

A number of reports are available to support that Vitamin C and E are beneficial in the prevention of the formation of nitrosamines, nitrosocompounds and nitrosodimethylamine (NDMA).

Schmahl and Eisenbrand (1982) reports that N-nitroso compounds occur environmentally in products and are also generated in vivo from their precursors. In the presence of ascorbic acid(Vitamin C), the formation of nitrosocompound is blocked. NDMA(nitrosodimethylamine) formation in saliva was inhibited up to 90% with ascorbic acid(Rao et al 1982). In the presence of ascorbic acid, formation of NDMA from nitrate in the stomach of a dog was depressed greatly (Lintas et al 1982).

Vitamin C is selected from ascorbic acid, calcium ascorbate and sodium ascorbate.

Vitamin C and E are effective in blocking the formation of nitrosamines in the gastrointestinal tract. When researchers gave 2,000 mg of Vitamin C and 400 I.U. of Vitamin E to 10 college students on a daily basis, they discovered that the ascorbic acid and Vitamin E blocked 95% nitrosamine formation(Wagner et al, 1985). Birt(1986) emphasized that prevention of cancer is achieved through the inhibitory effect of ascorbic acid by stopping the formation of nitrosamines and nitrosocompounds. Large doses of Vitamin C can reduce the incidence of hepatitis following surgeries that require blood transfusions. The Japanese reported a fall in the incidence of posttransfusion hepatitis from 7% in a control group of 150 patients to 0% in the group of 1100 patients administered with 2,000 mg of ascorbic acid daily (Murata 1975).

During soy sauce fermentation, the NDMA content was positively correlated with increased nitrate concentration. Nitrate at 400 mg/L resulted in an NDMA content of 20 μg/L. Ascorbic acid substantially inhibited NDMA to 4.4 μg/L which is a 98% reduction (Sung et al 1991)

Bland (1995) worte that to formation of nitrosamines, nitrates, and nitrites requires the combination of amines, which are obtained in the protein of normal diets with the aid of an acidic environment like the stomach. Vitamin C prevents nitrosamine formation by combining with the nitrates and nitrites and rendering them harmless.

Vitamin C is a master and essential nutrient in the prevention and cure of many diseases such as cancer, blood pressure, cholesterol, gastritis, hepatitis, and colds (Goodman 1991).

Vitamin C is safe to take in amounts more than 10 g per day(Challem 1983).

During fermentation of pickled vegetables such as kimchi, Vitamin C content in vegetables is reduced and the finished product contains far less Vitamin C than that of fresh vegetables (Seel et al).

It is desirable to fortify kimchi with Vitamin C. Whenever kimchi is consumed, Vitamin C could act as a standing army to prevent the formation of undesirable compounds such as nitrosamine, NDMA, and other nitrosocompounds which may be carcinogenic.

For Koreans who consume large amounts of kimchi on a daily basis, Vitamin C addition may provide many benefits such as powering the harmful effects of nitrate, powering blood pressure, any many other health benefits.

Kimchi contains about 2.75%(1.5–4%) salt and sauerkraut contains an average of 2.25% salt in relation to the weight of cabbage(Luh B. S. and Woodroof S. G. 1975 Commercial Vegetable Processing AUI Publishing Co.)

Koreans consume salt in much greater quantities than needed. Those that consume more salty soy paste and hot pepper bean paste have an increased occurrence of stomach cancer(Lee J. K. et al 1995).

Salt cured foods have been linked to gastric cancer(U.S. Surgeon General Report 1988). Americans consume ten times the sodium than their predecessors. An ideal ratio of sodium to potassium intake would be 1 to 4, but actually occurs in the reverse ratio of 4 to 1. High sodium diets increase both cancer incidence and metastasis(Quillin P. 1994). Reduction of salt consumption reduces the incidence of stomach cancer and stroke(Tuomilethto 1984).

To fortify with vitamins and substitute table salt (NaCl) with other beneficial salts, the fermentation rates of formation of acid in kimchi were measured according to pH.

This was done to see if vitamins or salt had any inhibitory effect on kimchi fermentation.

The reaction of Vitamin C(ascorbic acid, calcium ascorbate, and sodium ascorbate), Vitamin E, calcium chloride, potassium chloride, and magnesium chloride were studied along with table salt (sodium chloride).

To compare formation of acid during kimchi fermentation, a standard lactic acid concentration and pH were established by making various concentrations of lactic acid to fresh chopped raw kimchi(see Table 1)

The general acidity of kimchi to be pleasing taste is between a pH of 4.2–3.5(acid concentration 0.3%–0.7% as lactic acid).

To compare acid formation during kimchi fermentation, various amounts of lactic acid were added into fresh, raw kimchi which was chopped and blended. The pH was measured and was used the reference pH and acid concentration.

Lactic acid, citric acid, malic acid and acetic acid is used alone or together as organic acid.

During active fermentation more than 200,000,000 microbes are present per mL in kimchi liquid but these microbes are destroyed by an increased amount of lactic acid in the substrates within a few days of fermentation.

| Amount of Lactic Acid (%) | pH |
|---|---|
| 0 | 5.8 |
| 0.05 | 5.5 |
| 0.1 | 4.8 |
| 0.2 | 4.5 |
| 0.3 | 4.2 |
| 0.4 | 4.0 |
| 0.5 | 3.8 |
| 0.7 | 3.5 |
| 0.9 | 3.3 |
| 1.1 | 3.2 |
| 1.3 | 3.2 |

A better understanding of the present invention may be obtained in light of the following examples, which are set forth to illustrate, but are not to be considered to limit the present invention.

Comparative Example I (The preparation of standard kimchi)

This example includes no addition of Vitamin C(ascorbic acid, calcium ascorbate, or sodium ascorbate), vegetables (Chinese cabbage 70; oriental radish 30), and 2.5% salt added to weight of vegetables. Vegetables(sliced 1" thick), spices, salt and water were mixed and were immersed in a glass bottle. PH was measured from the kimchi liquid in intervals over a duration of the 0.5 and 60 hour period. PH changes of this standard kimchi recipe are used to analyze the fermentation rate of kimchi. PH is 5.8 at the 0.5 hr. mark, 5.5 at the 24 hr. mark, 4.1 at the 36 hr. mark, and 3.5 at the 48 hr, mark and 60 hr. mark, After 48 hour, over 0.5% of lactic acid was formed in kimchi (pH 3.5)

TABLE 1

| Kimchi Ingredient | Quantity (grams) |
|---|---|
| Chinese cabbage | 1000 |
| Garlic powder | 5 |
| Onion powder | 5 |
| Hot pepper powder | 10 |
| Salt | 25 |
| Calcium ascorbate | 10 |

EXAMPLE 1

To a standard sample, 1% ascorbic acid, and 0.5% calcium ascorbate were added. PH was 3.5 at the 0.5 hr. interval and kept under refrigeration.

EXAMPLE 2

To a standard sample, 20% of salt was replaced with other salts(magnesium chloride, calcium chloride and potassium chloride) and 0.5% of ascorbic acid was added to the weight of vegetables(as a result of the lower amount of ascorbic acid in comparison with Example 1). PH was shown as 3.8 at 0.5 hours and 4.8 after 24 hours and 36 hours. These results may indicate that the ascorbic acid was absorbed into the vegetable's texture, the acid concentration was equilibrated, and the acidity was not strong enough to inhibit fermentation. PH was shown at 3.5 after 48 hours and 60 hours, this shows that fermentation had taken place and produced the acidity.

Tartaric taste was noticed but at an acceptable level.

EXAMPLE 3

To a standard sample, 1% of calcium ascorbate, which in non-acidic Vitamin C, was added. The rate of fermentation was similar to the standard and the total acid was somewhat lower than standard after 48 and 60 hours of fermentation. PH changed from 5.8 at the 0.5 hour mark to 3.8 at the 60 hour mark. This example will enable a person to take 1000 mg(1 g) of Vitamin C when 100 g of kimchi is consumed.

EXAMPLE 4

To a standard sample, 1% Vitamin E(50% strength) was added in Example 4, 5 and 6, water was not added. Enough kimchi liquid was available from Chinese cabbage when the salt and spices were mixed together. PH noticeably changed after 36 hours of fermentation. Taste was acceptable. Each 100 g serving of kimchi consumption provides 500 mg of Vitamin E.

EXAMPLE 5

To a standard sample, 20% of table salt was replaced with potassium chloride, magnesium chloride, and calcium chloride; 0.4% ascorbic acid; 0.5% sodium ascorbate; and 4 organic acids(lactic acid, citric acid, malic acid and vinegar were added). Due to ascorbic acid and organic acids(totaling over 0.8% in comparison with the weight of cabbage), pH was shown to be 3.35 at the 0.5 hour mark and 3.5 at the 12 hour and 24 hour mark. This example resulted in an instant type of kimchi where the taste was acceptable.

EXAMPLE 6

To a standard sample, 1% of ascorbic acid was added and kept for 72 hours at room temperature. PH was 3.2 after the first 0.5 hour and stayed consistent at 3.8 from 24 to 72 hours; this indicates that fermentation had not taken place due to the high initial concentration of acidity present in ascorbic acid. The product is an instant kimchi or kimchi salad where the taste was acceptable with a mild, bitter taste.

EXAMPLE 7

Instead of Chinese cabbage, western cabbage was used as the kimchi vegetable; 1% of calcium ascorbate was added; and 20% of table salt was replaced with potassium chloride, magnesium chloride, and calcium chloride. Even though cabbage was cut into smaller pieces than Chinese cabbage, kimchi liquid was not released, so it was not sufficient to cover the mixture; therefore, water was added(15% to cabbage weight). Fermentation rate was somewhat slower than standard; it may be due to presence of a heavier texture. The quality of the product was appealing because of its crispiness and chewiness.

TABLE 2

| Raw Materials for kimchi (g) | Example 4 | Example 5 | Example 6 | Example 7 |
|---|---|---|---|---|
| Chinese cabbage | 400 | 400 | 400 | 0 |
| Cabbage | 0 | 0 | 0 | 400 |
| Garlic powder | 2 | 2 | 2 | 2 |
| Onion powder | 2 | 2 | 2 | 2 |
| Hot pepper powder | 4 | 4 | 4 | 4 |
| Salt (NaCl) | 10 | 8 | 10 | 8 |
| KCl | | 0.7 | | 0.7 |
| $MgCl_2$ | | 0.7 | | 0.7 |
| $CaCl_2$ | | 0.7 | | 0.7 |
| Ascorbic acid | | 1.6 | 4 | |
| Sodium ascorbate | | 2 | | 4 |
| Calcium ascorbate | | | | |
| Lactic acid | | 0.8 | | |
| Citric acid | | 0.4 | | |
| Malic acid | | 0.4 | | |
| Vinegar | | 1.5 | | |
| Vitamin E | 4 | | | |
| Water | | | | 60 |

TABLE 3

| | PH changes during fermentation | | | |
|---|---|---|---|---|
| Time | Example 4 | Example 5 | Example 6 | Example 7 |
| 30 minutes | 5.5 | 3.35 | 3.2 | 5.8 |
| 12 hours | 5.8 | 3.5 | 3.5 | 5.8 |
| 24 hours | 5.5 | 3.5 | 3.8 | 5.8 |
| 36 hours | 4.1 | put into refrigerator | 3.8 | 4.4 |
| 48 hours | 3.8 | | 3.8 | 3.8 |
| 60n hours | 3.5 | | 3.8 | 3.8 |
| 72 hours | 3.5 | | 3.8 | 3.8 | temperature 22–24 degrees Celsius

EXAMPLEs 8, 9, 10 and 11

To a standard sample, increased amounts of calcium ascorbate up to 2%, 0.2% and 0.4% of Vitamine E were added. PH was measured during a 96 hour fermentation period. The fermentation rate was slower, but after 96 hours, pH was 3.8 in all cases.

TABLE 4

| | (in grams) | | | |
|---|---|---|---|---|
| Raw materials for kimchi | Example 8 | Example 9 | Example 10 | Example 11 |
| Chinese cabbage | 600 | 600 | 600 | 600 |
| Garlic powder | 3 | 3 | 3 | 3 |
| Onion powder | 3 | 3 | 3 | 3 |
| Hot pepper powder | 6 | 6 | 6 | 6 |
| Salt | 15 | 15 | 15 | 15 |
| Calcium ascorbate | 4 | 6 | 9 | 12 |
| Vitamin E | 1.2 | 2.4 | 2.4 | 2.4 |
| Water | 0 | 0 | 0 | 0 |

TABLE 5

| | PH changes during fermentation | | | |
|---|---|---|---|---|
| Time | Example 8 | Example 9 | Example 10 | Example 11 |
| 30 minutes | 5.5 | 5.5 | 5.5 | 5.5 |
| 12 hours | 5.8 | 5.8 | 5.8 | 5.8 |
| 24 hours | 5.8 | 5.8 | 5.5 | 5.5 |

TABLE 5-continued

PH changes during fermentation

| Time | Example 8 | Example 9 | Example 10 | Example 11 |
|---|---|---|---|---|
| 36 hours | 5.8 | 5.8 | 4.4 | 4.8 |
| 48 hours | 4.8 | 4.8 | 4.1 | 4.1 |
| 60 hours | 4.4 | 4.6 | 4.1 | 4.1 |
| 72 hours | 3.8 | 4.0 | 3.8 | 3.8 |
| 84 hours | 3.8 | 3.8 | 3.8 | 3.8 |
| 96 hours | 3.8 | 3.8 | 3.8 | 3.8 | fermentation temperature 22–24 degrees Celsius

The following results were obtained:

1. Acidic Vitamin C, ascorbic acid(0.5–1% to kimchi substrate weight), can produce an instant type kimchi and inhibit the fermentation found in traditional kimchi making.
2. Non-acidic Vitamin C, calcium ascorbate or sodium ascorbate, can be added to kimchi up to 2% without inhibiting fermentation. Taste was acceptable.
3. Addition of Vitamin E up to 0.5% did not change the fermentation rate and Vitamin E can be added together with Vitamin C.
4. Table salt(NaCl) can be replaced with other nutritional salts as potassium chloride, magnesium chloride and calcium chloride up to 20%.
5. For instant-kimchi, ascorbic acid can be added alone or along with other organic acids like lactic acid, citric acid, malic acid and vinegar.
6. Western cabbage produced a kimchi with better texture (crispier). In addition to the substitution of Chinese cabbage with western cabbage, 1% Vitamin C was added. Therefore, Vitamin C can be added into cole slaw, sauerkraut and pickles.
7. Addition of 2% Vitamin C to kimchi will cause the average Korean who consumes 180 g(6 ounces) of kimchi per day, to consume 3600 mg(3.6 g) of Vitamin C. This amount will result in an intake that is 60 times the amount recommended by the RDA.
8. Vitamin A was tried, but the taste of the kimchi was not pleasing.

To the Korean who consumes large quantities of kimchi daily, throughout their life, kimchi enhanced with Vitamin C or E will harbor many benefits. These benefits from these master nutrient vitamins include lowering cholesterol, lowering blood pressure, reducing the risk of stroke, increasing immune response, and perhaps the lowering of the risk of stomach cancer from nitrate.

What is claimed is:

1. A method for preparing kimchi comprising the steps of:
    preparing a mixture of vegetables and spices to be used in the preparation of kimchi;
    adding an effective dietary supplemental quantity of Vitamin C of approximately 0.1% to 2.4% by weight Vitamin C and an effective dietary supplemental quantity of Vitamin E of approximately 0.1% to 1% by weight Vitamin E to the mixture of vegetables and spices prior to fermentation; and
    fermenting the mixture, the Vitamin C and the Vitamin E to produce kimchi exhibiting an increased Vitamin C and Vitamin E content.
2. The method in accordance with claim 1, wherein said vegetables are selected from the group consisting of Chinese cabbage, regular cabbage, radish, cucumber, mustard green, dandelion, chicory, endive, perilla leaves, bell flower plant root, leeks, chives, garland chrysanthemum, burdock, ginseng root, kale, collard greens, lettuce, squash and broccoli.
3. The method in accordance with claim 1, wherein said spices are selected from group consisting of Japanese parsley, spring onion, garlic, onion, ginger root, hot pepper, salt and seafood sauces.
4. The method in accordance with claim 3, wherein said salt is replaced with potassium chloride, magnesium chloride, or calcium chloride in amounts up to 20%.
5. The method in accordance with claim 1, wherein said Vitamin C is selected from the group consisting of ascorbic acid, calcium ascorbate, ester-C and sodium ascorbate.
6. The method in accordance with claim 1 wherein, Vitamin C, Vitamin E and organic acids are added together in the preparation of kimchi.
7. The method in accordance with claim 6, wherein said organic acid is selected from the group consisting of lactic acid, citric acid, and acetic acid.
8. The method in accordance in claim 1, Vitamin C and/or Vitamin E are added into kimchi vegetables and spice mixes prior to fermentation, during fermentation, or after fermentation before packing.

* * * * *